Jan. 12, 1960 D. J. W. BOAG 2,921,222
ELECTRIC ARC WELDING APPARATUS
Filed Aug. 11, 1958 6 Sheets-Sheet 1

D. J. W. BOAG
INVENTOR

BY
ATTORNEYS

Jan. 12, 1960     D. J. W. BOAG     2,921,222
ELECTRIC ARC WELDING APPARATUS

Jan. 12, 1960  D. J. W. BOAG  2,921,222
ELECTRIC ARC WELDING APPARATUS
Filed Aug. 11, 1958  6 Sheets-Sheet 6

D. J. W. BOAG
INVENTOR

BY Moore & Neil
ATTORNEYS

United States Patent Office 2,921,222
Patented Jan. 12, 1960

2,921,222

ELECTRIC ARC WELDING APPARATUS

David James Wilson Boag, Croydon, England

Application August 11, 1958, Serial No. 754,226

Claims priority, application Great Britain August 22, 1957

19 Claims. (Cl. 314—69)

This invention relates to improvements in automatic electric arc welding apparatus of the type having an automatic feed device for feeding a consumable electrode to the weld. Such apparatus may have a driven carriage for moving the automatic feed device along a workpiece. The automatic feed device then operates to feed the consumable electrode automatically to the weld at the correct speed as the carriage moves along the work piece.

Alternatively, the work piece may be moved and the automatic feed device remain stationary. In this case, the work piece may be moved laterally past the electrode or moved vertically downwards below the electrode as the type of working requires.

It is known to construct an automatic feed device for such apparatus, having drive rolls driven from the output of a differential gear, the two inputs of which are connected to two electric motors rotating in relatively opposite sense. By controlling the speed of one of the motors, the output of the differential can be varied to increase or reduce the rotational speed of the drive rolls as required.

As is well known, the voltage across an arc increases as the arc length increases, and falls as the arc length is reduced. In the limiting conditions, the voltage is zero when the electrode is moved so close to the work piece that a short circuit results. When the electrode is moved so far away that the arc is extinguished, the voltage is the full open circuit voltage of the welding circuit.

By controlling the motor of variable speed from the arc voltage and sensing the arrangement so that the speed of the drive rolls is increased as the arc length increases, the feed may be arranged to give a measure of automatic control of the arc length.

However, such an arrangement has certain practical disadvantages. The arc voltage is made up for the major part by a terminal voltage and for the minor part only by a voltage which varies with the arc length. Thus, a large ratio of variation of the arc length results in a smaller ratio of variation in the arc voltage. Moreover, under short circuit conditions or nearly short circuit conditions, the direction of drive of the drive rolls must be reversed. This serves to withdraw the electrode from the work piece, to avoid extinction of the arc and to avoid the welding of the electrode to the work piece.

The object of the present invention is to provide an improved automatic feed device, for arc welding apparatus using an A.C. welding current, which is more satisfactory in operation than known feed devices.

According to the present invention, an automatic feed device for a consumable electrode in electric arc welding apparatus comprising electrode drive rolls driven from the output of a differential gear by two motors rotating relatively in opposition, has the speed of the drive rolls controlled by variation of the speed of both motors in opposite sense, the variation of the speed of both motors being controlled by both the magnitude and the phase of the arc voltage or of the arc current. Thus, if the arc length increases, the change in phase and increased arc voltage, or the change in phase and reduced arc current, are applied to increase the speed of one motor and decrease the speed of the other, so that the speed of the drive rolls is increased by the differential gear output. The increased rate of feed of the electrode thus reduces the arc length. If the arc length is decreased below the required value, the opposite action occurs, so that the arc length is increased. By means of this control, the consumable electrode is fed at such a rate that the arc length is automatically maintained at the desired length as the weld proceeds.

If the electrical quantity used, varying with arc-length, is the arc voltage, this voltage is preferably connected in series with a backing voltage. If a voltage or current is derived from the arc current, this voltage or current may similarly be employed in opposition to a backing voltage or current, as the case may be.

The motors connected to the differential gear inputs may conveniently be electric motors, for example, D.C. electric motors supplied through rectifiers from A.C. sources.

Conveniently, the two motors are supplied from separate transformer windings, the voltages across the two said windings being varied in opposite sense by variation of the magnitude and phase of the arc voltage or arc current.

To this end, the two said windings may be wound on separate transformer limbs, both limbs carrying a magnetic flux due to the vector resultant of the arc voltage and a backing voltage, or of the voltage representative of the arc current and a backing voltage, or of the arc current and a backing current, or a flux representative of the arc current alone.

In the preferred embodiment, the supply for the two electric motors is derived from separate windings, one on each of the outer limbs of a three-limb transformer. The flux due to the vector resultant of the arc quantity and the backing quantity is then developed in the centre limb of the transformer and the resulting flux unbalance serves to increase the voltage across one of the outer limb secondary windings and correspondingly reduce the voltage across the other.

In an electrically equivalent arrangement, the three-limb transformer is replaced by two separate transformers.

In these arrangements, it is preferred to obtain the various electric supplies from a three-phase supply, so phasing the input to the welding transformer, and hence the phase of the arc voltage and current, the phase of the input to the three-limb transformer and the phase of the backing quantity, that the control is made most sensitive under the condition of arc short circuit or near short circuit.

An automatic feed device according to the invention may be applicable to the use of any metal electrode or composite electrode of metal, powdered metal or powdered alloys, of an electrode containing or coated with a flux, and may be used for arc welding with or without shielding gases, such as the inert gases or carbon dioxide.

In order that the invention may be readily carried into effect, three embodiments thereof will now be particularly described by way of example, with reference to the drawings accompanying this specification, of which:

Figure 1:
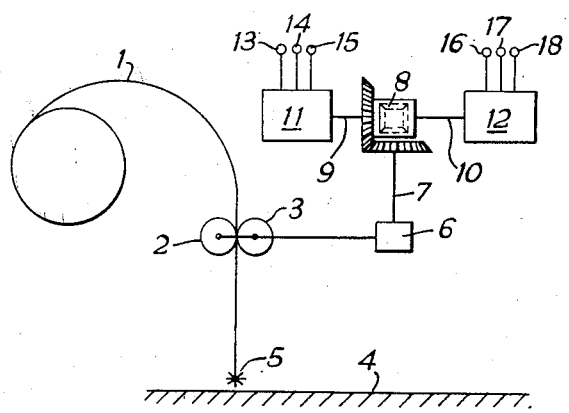
Fig. 1 is a diagrammatic representation of an automatic feed device for a consumable electrode driven by two contra-rotating electric motors through a differential gear.

In Fig. 1 of the drawings, a consumable electrode 1 passes between drive rolls 2 and 3. Rotation of the drive rolls 2 and 3 in opposite sense moves the electrode 1 towards the work piece 4 to maintain a welding arc 5. The drive rolls 2 and 3 are driven through gearing 6 from the output shaft 7 of a differential gear 8, the input shafts 9 and 10 of which are connected respectively to electric motors 11 and 12. The motor 11 drives the gear 8 in the sense which, if the motor 12 were stationary, would rotate the drive rolls 2 and 3 to move the electrode 1 upwards, that is away from the work piece 4. The motor 12 drives the gear 8 in the opposite sense to move the electrode 1 in the downward direction. The motor 11 is supplied from armature terminals 13 and 14 and field terminals 13 and 15. The motor 12 is supplied from armature terminals 16 and 17 and field terminals 16 and 18.

The device shown diagrammatically in Fig. 1 may be moved longitudinally of the work piece 4 by a carriage (not shown) or it may be kept stationary and the work piece 4 moved either laterally or downwardly.

Figure 2:
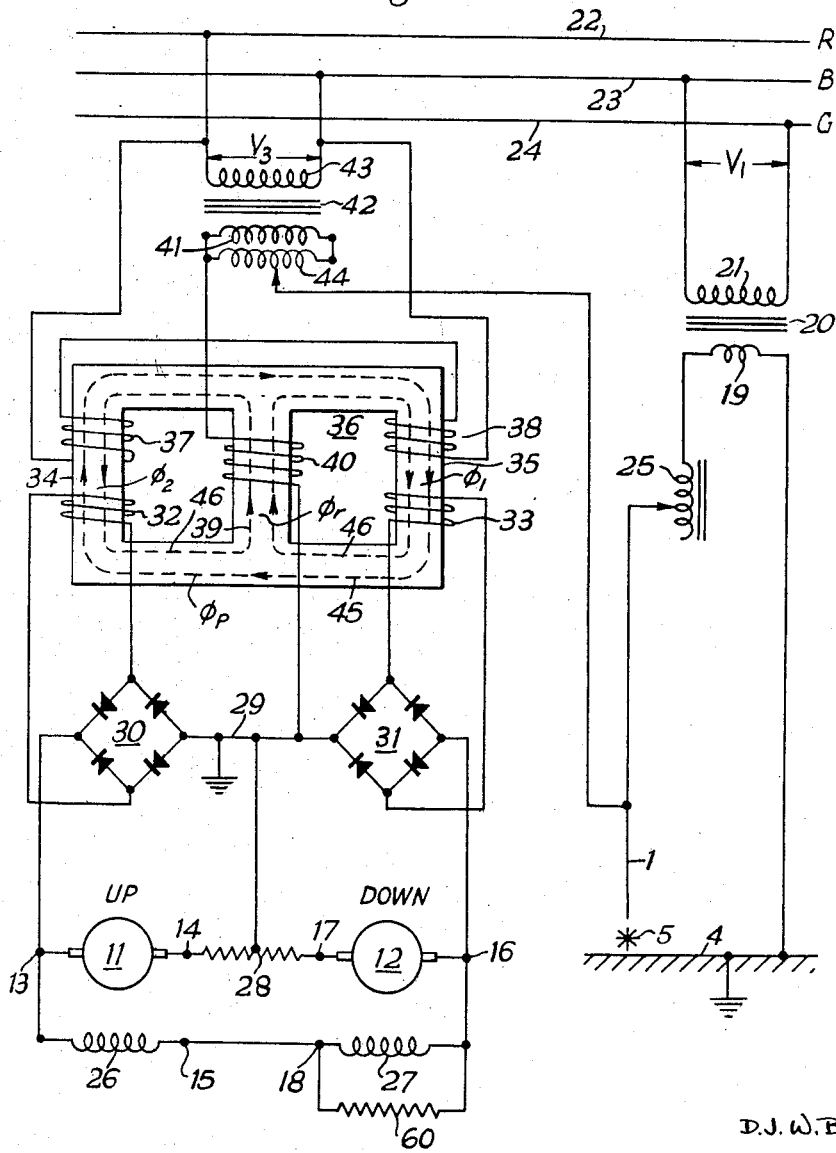
Fig. 2 is a circuit diagram of the control circuit for the electric motors of the feed device of Fig. 1.

In Fig. 2, the parts corresponding to those shown in Fig. 1 are indicated by the same reference numerals. The arc current to maintain the arc 5 is supplied from the secondary 19 of a step-down welding transformer 20 having its primary winding 21 connected across phases B and G of a three-phase supply 22, 23, 24. One end of the secondary winding 19 is connected directly to the work piece 4, which is earthed, and the other end of the winding is connected through a variable choke 25 to the welding electrode 1. In this example, the "up" motor 11 and the "down" motor 12 have their field windings 26, 27 respectively connected in series between terminals 13 and 16, terminals 15 and 18 being connected together. The field winding 27 of the "down" motor 12 has a resistor 60 connected in parallel therewith to provide a starting characteristic of the feed head which is described later. The armature terminals 14 and 17 are connected to the ends of a preset tapped resistor 28, the tap of which is connected to an earthed line 29 joining two bridge-connected rectifiers 30 and 31.

The rectifiers 30, 31 are supplied by alternating currents derived respectively from secondary windings 32 and 33, wound respectively on the outer limbs 34, 35 of a three-limb transformer 36. The limbs 34, 35 of transformer 36 carry primary windings 37 and 38 respectively. These windings 37 and 38 are connected in series and their outer ends are connected between phases R and B of the three-phase supply 22, 23, 24.

The centre limb 39 of transformer 36 has a winding 40 wound thereon, one end of winding 40 being connected to earth. The other end of winding 40 is connected to one end of a variable transformer 44. The ends of the variable transformer 44 are supplied from a secondary winding 41 of a step-down transformer 42. The sliding contact of the variable transformer 44 is connected to the electrode 1.

The primary windings 37 and 38 of transformer 36 provide a flux $\phi_p$ which flows through the outer limbs of the transformer but which does not flow through the centre limb. This flux is indicated by the dotted line 45 in Fig. 2. The winding 40 on the centre limb 39 carries a current determined by the vectorial resultant of the arc voltage and the output voltage of the variable transformer 44, which latter is a backing voltage substantially in phase opposition to the arc voltage. The resultant current flow through the winding 40 produces a flux $\phi_r$ indicated by the dotted lines 46, which it will be seen creates a flux unbalance in the transformer 36 which, by vectorial addition, augments the flux in one outer limb and reduces the flux in the other. In Fig. 2, the flux 46 is shown as augmenting the primary flux 45 in the limb 35 to provide a resultant flux $\phi_1$ and as reducing the primary flux 45 in limb 34 to produce a resultant $\phi_2$.

The voltage output of the secondary windings 32, 33 is proportional to the resultant flux in the corresponding transformer limbs. Thus, the output of secondary winding 32 and the D.C. output of rectifier 30 are proportional to $\phi_2$. Similarly, the output of secondary winding 33 and of rectifier 31 are proportional to $\phi_1$.

Since the voltage from the variable transformer 44 is constant for any particular setting thereof, it will be seen that the current through winding 40 is dependent upon the voltage across the arc 5. If the length of the arc 5 increases above the required arc length, the arc voltage also increases, so that the resultant of the arc voltage and the backing voltage provided by winding 44 increases. This provides an increased current through the winding 40 and a greater difference between the resultant of the fluxes in the limbs 34 and 35 of the transformer 36. The output of winding 32 and rectifier 30 falls, whereas the output of winding 33 and rectifier 31 increases. The motor "up" 11 is driven more slowly than previously, and the "down" motor 12 is driven faster. In consequence, the output of the differential gear 8 is increased and the drive rolls 2 and 3 are driven faster, so that the electrode is fed more quickly and the arc length reduced. This control provides the constant arc length required. As the arc length is reduced, so is the arc voltage and the difference in speed of the motors 11, 12 until the difference in motor speed provides a downward feeding speed of the electrode 1 which corresponds with the stead rate at which it is consumed.

Figure 3:
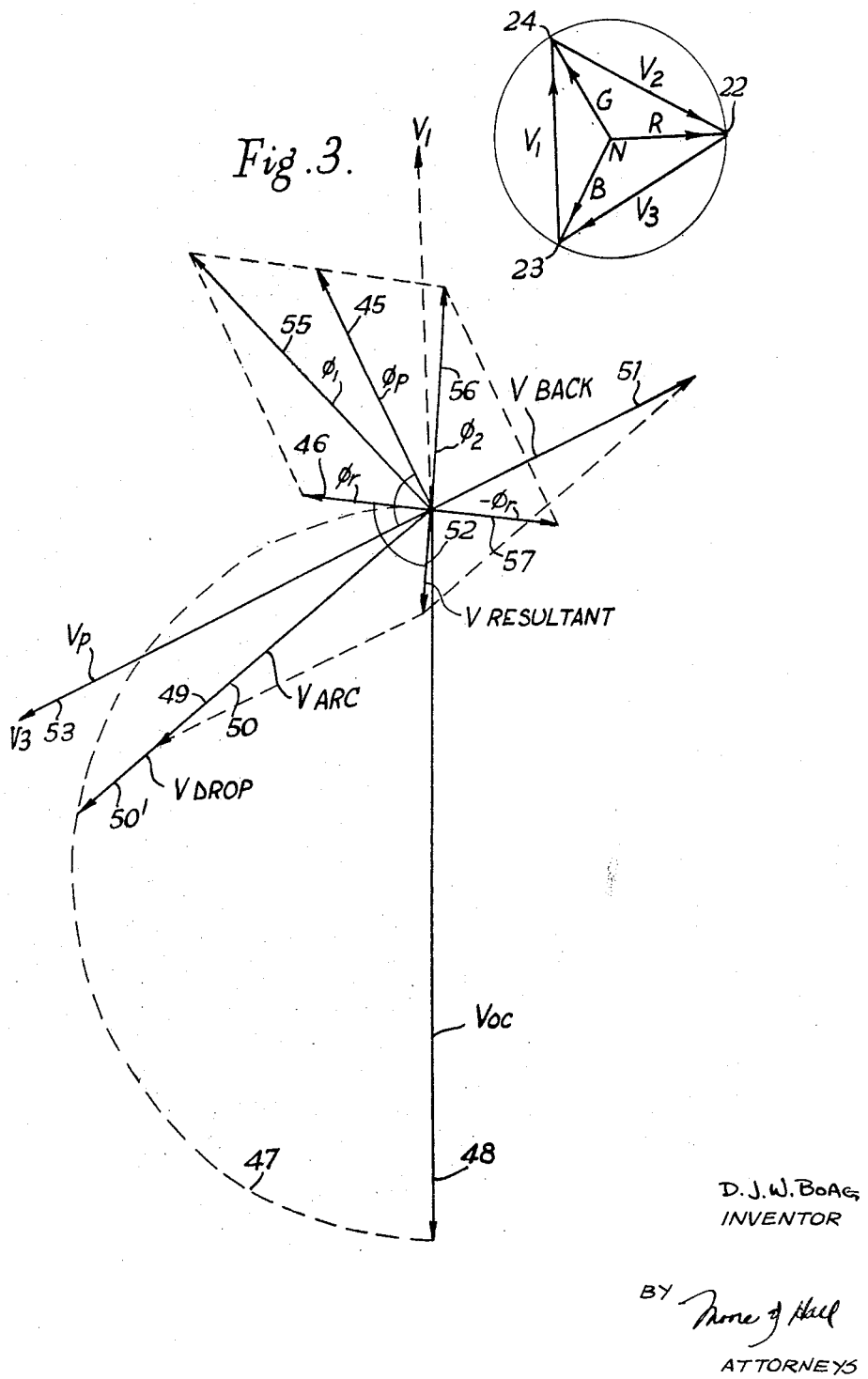
Fig. 3 is a phase diagram explaining the operation of the circuit of Fig. 2.

This action is shown more clearly with reference to the phase diagram of Fig. 3. The inset diagram shows the phase relationship of the voltages between the phases R, B and G of the 3-phase supply 22, 23 and 24 at a given instant. In the main diagram, the vector V1 between phases B and G and V3 between R and B are shown for reference. The dotted line 47 shows the locus of the voltage of arc 5, plus the in-phase voltage drop due to the resistance in the arc circuit, between the short circuit value, which of course is zero arc voltage, and the open circuit value represented by vector 48 of magnitude Voc, which may be some 60 to 70 volts in this practical example. The arc voltage which it is required to maintain is represented by the vector 49 which is made up of two parts, the part 50 representing the arc voltage and 50' representing the resistive drop in the leads, choke 25 and transformer secondary winding 19. In this example, the arc voltage 50 may be some 31 volts. The backing voltage output of the variable transformer 44 is represented by the vector 51, which is substantially opposite in phase to the vector V3. For one setting of the variable transformer 44, the backing voltage may be 26.5 volts which, at the values given, and the phase relationship shown in Fig. 3, provides a resultant voltage across winding 40, represented in phase and amplitude by the vector 52. In this case, the phase is nearly opposite to that of vector V1 and the resultant voltage is 8 volts.

For simplicity of this explanation, voltage drops due to circuit resistance are not shown in relation to the voltage vectors for the transformer 36 and the corresponding fluxes are shown lagging 90° behind these simplified voltage vectors.

The voltage across the primary windings 37 and 38 of transformer 36 is shown by vector 53 and the flux $\phi_p$ is thus represented by vector 45. The flux $\phi_r$, due to the resultant of the arc voltage and the backing voltage, vector 52, is shown by vector 46, for limb 35 where it augments the flux $\phi_p$ by vectorial addition and by vector 57 ($-\phi_r$) for limb 34 where it reduces the flux $\phi_p$ by vectorial addition. The fluxes $\phi_1$ and $\phi_2$ in the limbs 35 and 34 respectively of transformer 36 are shown respectively by the vectors 55 and 56. It will be noted that vector 55, the vector of larger magnitude, is associated with the "down" motor 12.

For most satisfactory operation of an automatic feed device, it is desirable to have maximum sensitivity under arc short circuit conditions, or nearly short circuit conditions, both for starting and when in operation, since it is then necessary to withdraw the electrode quickly from the work piece to maintain the correct arc length. Under short circuit conditions, the arc voltage is zero, and at nearly short circuit conditions the phase angle is indicated by the angle between the vector 48 and the vector 50' from vector origin to locus 47 when the vector 50 is zero or almost zero. Under completely short circuit conditions, when the arc voltage is zero, the current flowing through the winding 40 is due entirely to the output voltage of the variable transformer 44, as shown by vector 51 in the vector diagram. Since the transformer 42 is connected between the same phases as the primary of transformer 36, the flux 46 due to the winding 40 is nearly in phase with the primary flux 45 and nearly the maximum difference between $\phi_1$ and $\phi_2$ results. Under these conditions, the electrode is actually withdrawn from the work piece.

Immediately the arc is restruck, the arc voltage has a lagging phase angle due to the inductive welding circuit and is in near phase relationship with the primary voltage of transformer 36, vector 53. Consequently, the voltage of the re-ignited arc is nearly in opposite phase to the backing voltage of variable transformer 44, and the flux in transformer 36 is similarly nearly in phase. Due to this close phase relationship of the component voltages, the resultant voltage across winding 40 produces a control flux 46 closely in phase, or opposite phase, with the primary flux 45, resulting in an immediate decrease of the rate at which the electrode is withdrawn from the work piece. Hence, the rate at which the arc length is increased is rapidly reduced to the condition of normal control, in which normal condition the arc length is maintained by the speed at which the electrode is fed towards the work piece.

The sensitivity of the response can be adjusted by choosing suitable phase relationships of the various voltages which determine the fluxes in the transformer 36. In certain circumstances, this may also be used to counteract the effect of mains voltage variation.

Figure 4:
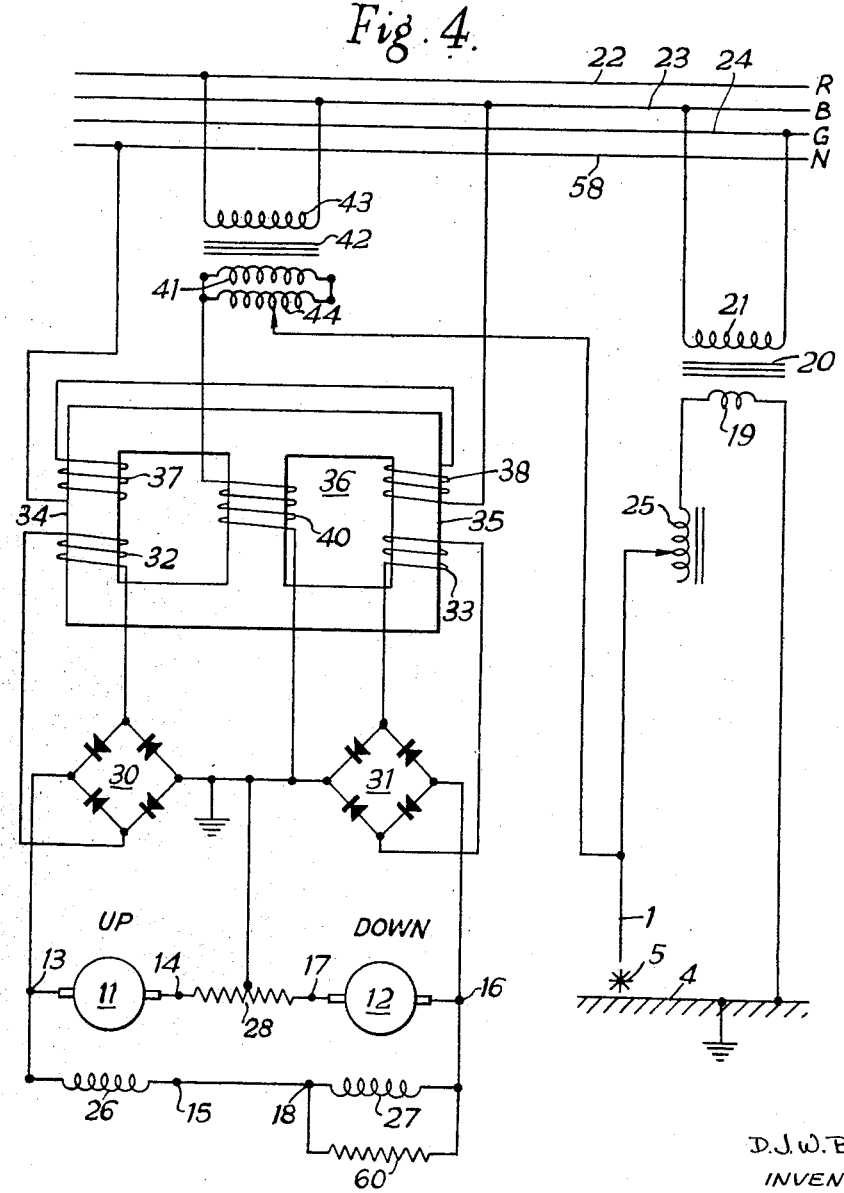
Fig. 4 is a circuit diagram of a control circuit similar to that of Fig. 2 but having different phase relationships of the applied voltages.
Figure 5:
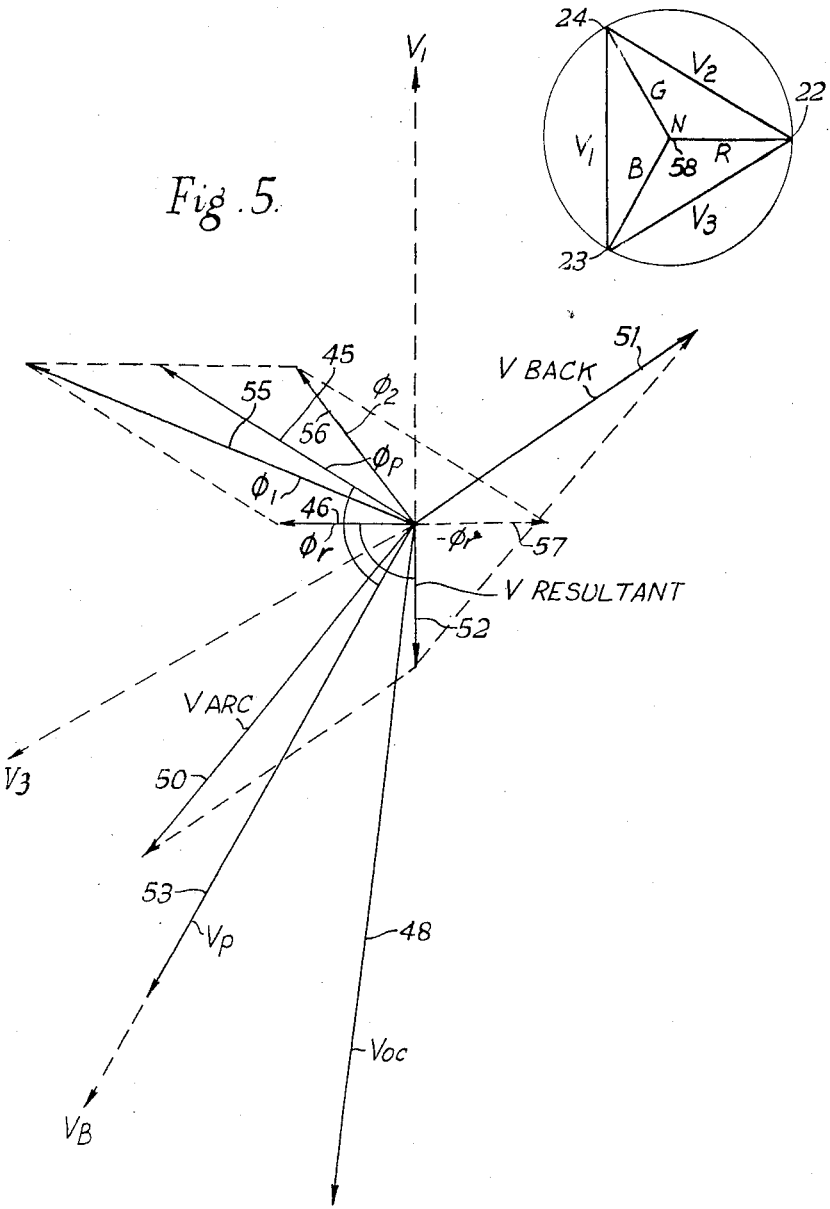
Fig. 5 is a phase diagram explaining the operation of the circuit of Fig. 4.

Fig. 4 and the phase diagram of Fig. 5 show an alternative phase relationship of the various voltages due to a different manner of connecting the transformers 42 and 36, which can result in slightly lower control sensitivity but better control with mains voltage variation.

In Fig. 4, components corresponding to those in Fig. 2 are indicated by the same reference numerals. The primary 21 of the transformer 20 is similarly indicated between phases B and G of a 3-phase, 4-wire supply, 22, 23, 24, 58, the additional line being the neutral line N. The transformer 42 similarly has its primary winding 43 connected between phases R and B of the supply. The primary winding of transformer 36, however, is connected between phase B and neutral.

The different phase relationship of the voltages is shown in Fig. 5, in which the vectors corresponding to V1, V3 and $V_B$ are shown in broken lines for reference. It will be noted that the primary voltage of transformer 36 now corresponds with the voltage $V_B$ and the primary flux $\phi_p$ is shown by the new position of vector 45. The backing voltage, vector 51, and the arc voltage, vector 50, are substantially unchanged, giving a resultant voltage, vector 52, which provides the flux $\phi_r$, due to winding 40, represented by vector 46 and by vector 57 ($-\phi_r$) in the same way as Fig. 3. Similarly, the amplitude and phase of the resultant fluxes in limbs 35 and 34 of transformer 36 are shown respectively by the two vectors 55 and 56. As in the arrangement of Fig. 2, the vector 55, of larger magnitude, is associated with the "down" motor 12 and the vector 56 is associated with the "up" motor 11.

The foregoing description explains the running operation of the automatic feed device to maintain the required constant arc length as welding proceeds.

For setting up the feed device, before switching on the welding current and before switching to automatic control of the electrode feed, the electrode 1 is moved downwards until it is in contact with the work piece 4.

For this purpose, a voltage is derived from a fixed tapping of the variable transformer 44 and applied across the winding 40 of transformer 36. The voltage is of such magnitude and applied across winding 40 in such sense that the output of rectifier 31 is greater than that of rectifier 30 by a constant amount, so that the motor 12 runs faster than motor 11 and provides a steady downwards feed of the electrode 1.

By means of a commutator switch which reverses the supplies of the rectifiers 30, 31 to the motors 11, 12, so that the rectifier 30 feeds motor 12 and rectifier 31 feeds motor 11, a constant upwards feed of the electrode 1 is provided.

Figure 6:
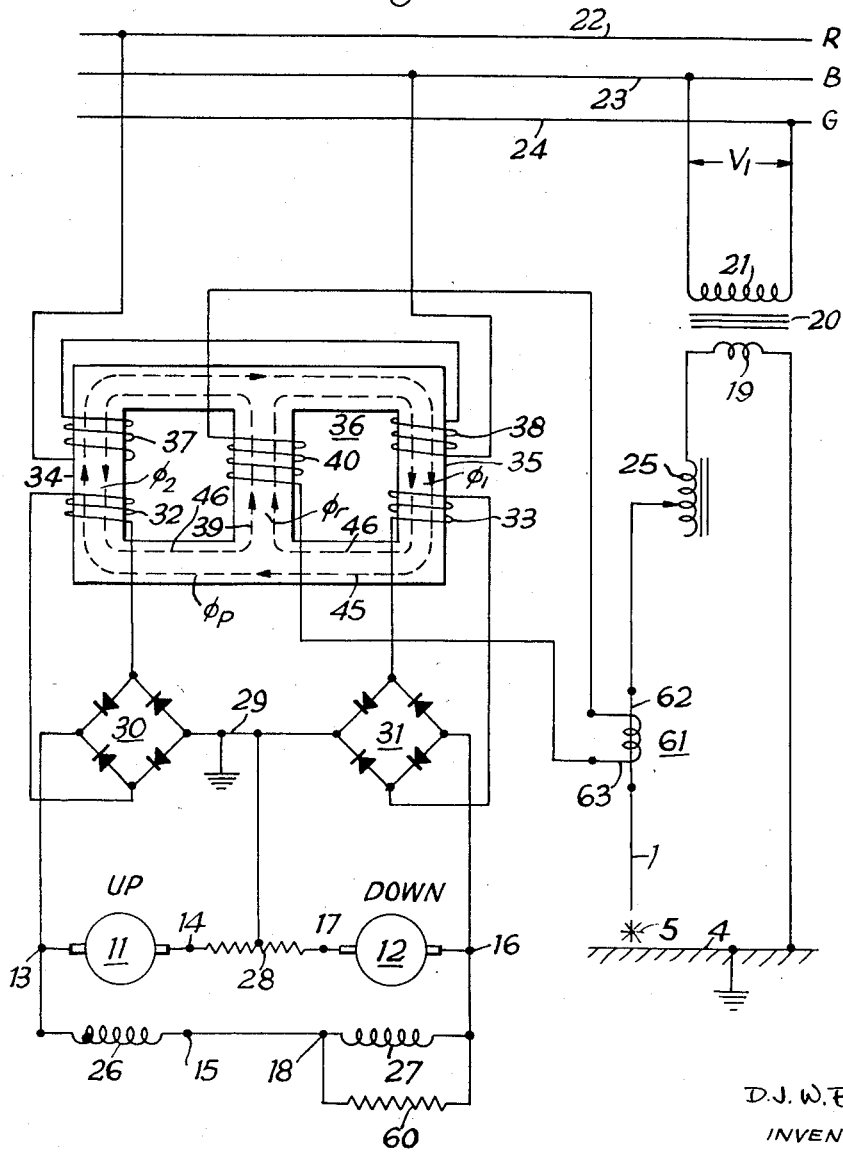
Fig. 6 is a circuit diagram of a control circuit generally similar to that of Fig. 2, but in which a control quantity is derived from the arc current.

The tapping of variable transformer 44 and the switches referred to for providing this so-called "Inching control" for initial setting up of the feed device have not been shown in the drawings, Figs. 2, 4 and 6, for simplicity, but the required modification of the circuit arrangements illustrated will be evident from the foregoing description.

As an alternative to obtaining a voltage from the variable transformer 44, the required voltage may be derived from a tapping of the secondary winding 41.

After the electrode 1 has been moved into contact with the work piece, the welding current and automatic operation of the feed device are switched on simultaneously. This is effected by closure of a multiple switch, the welding circuit being energised by a contactor.

Immediately thereupon a supply voltage is provided to each of the motors 11, 12 and the short-circuit condition exists, so that the electrode is rapidly withdrawn from the work piece in the manner previously described. However, at the moment of switching on, this normal running control action is assisted by the shunt resistor 60 connected across the field winding 27 of the "down" motor 12. Due to the shunt resistor 60, the "up" motor 11 develops the greater starting torque and is, therefore, the first motor of the two to run up to speed. This action assists the initial lift of the electrode 1 way from the work piece 1 causing the arc 5 to strike.

Immediately the arc 5 strikes, the controlling arc voltage is present, so that the automatic control of the feed device already explained comes into effect.

It will be appreciated that the shunt resistor 60, besides providing this starting characteristic of the feed device, also affects the steady running characteristic, in that the "down" motor 12 is caused to run faster than the "up" motor 11. This is desirable, because a condition of constant arc length requires a constant downward rate of feed of the electrode 1 at the same rate as the electrode is consumed. A predetermined bias of the feed device towards the downward feed condition is provided by the shunt resistor 60 and by the setting of the preset tapped resistor 28.

The overall sensitivity of the automatic feed is controlled by the setting of the variable transformer 44 and may be additionally controlled, as an alternative, by tapping the winding 40 of transformer 36 and permitting the control currents to flow through a greater or smaller number of turns.

Fig. 6 shows an arrangement generally similar to that shown in Fig. 2 and in which corresponding circuit elements are indicated by the same reference numerals. However, in the arrangement of Fig. 6, the arc current is employed to provide the control of the feed device instead of the arc voltage as in the arrangements of Figs. 2 and 4.

It is possible to use the arc current as a controlling quantity by causing the arc current to flow through a winding 40, for example of a single turn, arranged on the centre limb of transformer 36.

However, it is preferred to use a current transformer 61 having a primary conductor 62 connected to carry the arc current and having a secondary winding 63 connected to the winding 40 of transformer 36.

As a further alternative, a voltage derived from the secondary winding of a transformer, such as transformer 61 of Fig. 6, may be combined in opposed phase relationship with a voltage of constant magnitude and phase relationship, derived from a variable transformer such as transformer 44 of Fig. 2, and the resultant voltage applied across the winding 40 of transformer 36 to provide the control flux therein.

What I claim and desire to secure by Letters Patent is:

1. An automatic feed device for a consumable electrode in electric arc welding apparatus having an arc current supply circuit energized by an alternating current supply, comprising in combination electrode drive rolls for engaging and feeding the consumable electrode, a differential gear having two input shafts and an output shaft, the output shaft being connected to rotate the drive rolls, each input shaft being driven by one of two motors, the two motors being arranged for rotation in opposite relative senses, motor control means for controlling speeds of the two motors in opposite senses in response to the magnitude and phase of an input signal, and means connected to the arc current supply circuit for supplying to the motor control means an input signal which varies progressively in magnitude and phase with variation of welding arc length.

2. An automatic feed device as claimed in claim 1, in which the input signal to the motor control means is an electrical signal which is the vectorial resultant of a voltage representative of the magnitude and phase of the arc voltage and a voltage of fixed phase relationship to the alternating current supply.

3. An automatic feed device as claimed in claim 2, in which the input signal to the motor control means is an electrical signal which is the vectorial resultant of the arc voltage and a voltage of fixed phase relationship to the alternating current supply.

4. An automatic feed device for a consumable electrode in electric arc welding apparatus having an arc current supply circuit energized from an alternating current supply, comprising in combination electrode drive rolls for engaging and feeding the consumable electrode, a differential gear having two input shafts and an output shaft, the output shaft being connected to rotate the drive rolls, each input shaft being driven by one of two motors, the two motors being arranged for rotation in opposite relative senses, motor control means for controlling the speeds of the two motors in opposite senses in response to the magnitude and phase of an input signal and means including a current transformer having a primary winding connected to the arc current supply circuit for supplying to the motor control means an input signal representative of the magnitude and phase of the arc current.

5. An automatic feed device as claimed in claim 4, in which the electrical input signal to the motor control means is the vectorial resultant of a voltage representative of the magnitude and phase of the arc current and a voltage of fixed relationship to the alternating current supply.

6. An automatic feed device as claimed in claim 4, in which the electrical input signal to the motor control means is derived from the secondary of a current transformer having its primary connected to carry the arc current.

7. An automatic feed device for a consumable electrode in electric arc welding apparatus having an arc current supply circuit energized from an alternating current supply, comprising in combination electrode drive rolls for engaging and driving the consumable electrode, a differential gear having two input shafts and an output shaft, the output shaft being connected to drive the drive rolls, each input shaft being driven by one of two motors, the two motors being arranged for rotation in opposite relative senses, the motor control means for controlling the speed of at least one motor in response to the magnitude and phase of an input signal and signal supply means connected to the arc current supply circuit for supplying to the motor control means an input signal varying progressively in magnitude and phase with variation of welding arc length the sense of motor speed control being such as to increase the drive roll speed when the arc length decreases thereby to maintain substantially constant welding arc length.

8. An automatic feed device for a consumable electrode in electric arc welding apparatus having an arc current supply circuit energized from an alternating current supply, comprising in combination electrode drive rolls for engaging and feeding the consumable electrode, a differential gear having two input shafts and an output shaft, the output shaft being connected to rotate the drive rolls, each input shaft being driven by one of two variable speed electric motors, the two motors being arranged for rotation in opposite relative senses and the speeds of the two motors being controlled in opposite senses by motor control means which are responsive to an input signal which varies progressively in magnitude and phase with variation in welding arc length and the motor control means including two transformer windings each connected to supply one of the variable speed electric motors and the supply voltages across the two windings being varied in opposite senses to control the motor speeds.

9. An automatic feed device as claimed in claim 8, in which the motor control means includes a ferromagnetic core providing two magnetic circuits each magnetic circuit linking with one of the two transformer windings and both magnetic circuits linking with a winding carrying the input signal.

10. An automatic feed device as claimed in claim 9, in which the input signal is an electrical signal representative of the magnitude and phase of the arc voltage.

11. An automatic feed device as claimed in claim 10, in which the input signal is the vectorial resultant of the arc voltage and a voltage of fixed phase relationship to the alternating current supply.

12. An automatic feed device as claimed in claim 11, in which the electric arc welding apparatus is powered from a 3-phase alternating current supply and includes a welding transformer connected between two of the phases of the 3-phase supply and the input signal to the motor control means is the vectorial resultant of the arc voltage and a voltage derived by way of at least one transformer connected between two phases of the 3-phase supply other than the two phases between which the welding transformer is connected.

13. An automatic feed device as claimed in claim 12, in which the input signal to the motor control means is the vectorial resultant of the arc voltage and a voltage derived from the output of a variable transformer, the input to the variable transformer being supplied from the said two phases of the 3-phase supply by way of a further transformer.

14. Electric arc welding apparatus including a welding transformer for connection between two terminals of a 3-phase alternating current supply and an automatic feed device for a consumable electrode, the automatic feed device comprising in combination electrode drive rolls for engaging and feeding the consumable electrode, a differential gear having two input shafts and an output shaft, the output shaft being connected to rotate the drive rolls, each input shaft being driven by one of two variable speed electro motors, the two motors being arranged for rotation in opposite relative sense and the speeds of the two motors being controlled by motor control means responsive to an electric input signal, the motor control means including at least one magnetic core providing two magnetic circuits, each magnetic circuit passing through a primary winding for carrying current flowing between two terminals of the 3-phase supply, each magnetic circuit passing through a secondary winding connected to supply one of the variable speed electric motors and both magnetic circuits passing through at least a part of a control winding to which is applied the electric input signal, the input signal being the vectorial resultant of the arc voltage and a voltage derived from two terminals of the 3-phase supply, the phasing of the primary windings, the secondary windings and the control winding being such that variation of the input signal increases the supply voltage to one motor and reduces the supply voltage to the other.

15. Electric welding apparatus as claimed in claim 14, in which the motor control means includes a 3-limb core having two outer limbs each associated with one of the two magnetic circuits and a centre limb associated with both magnetic circuits, each outer limb carrying a primary winding and a secondary winding and the centre limb carrying the control winding.

16. Electric welding apparatus as claimed in claim 15, in which the secondary windings supply the variable speed electric motors by way of rectifiers.

17. Electric welding apparatus as claimed in claim 16, in which the electric motors comprise field and armature windings, the rectifiers have their output terminals serially connected, the field windings of the motors are serially connected and connected across the outputs of both rectifiers and the armature windings of the motors are serially connected by way of an intermediate tapped resistor, the junction of the serially connected rectifiers being connected to the tapping of the tapped resistor.

18. Electric welding apparatus as claimed in claim 17, in which the field winding of one of the two motors has a resistor connected in shunt therewith.

19. An automatic feed device for a consumable electrode in electric arc welding apparatus having an arc current supply circuit energized from one phase of a three-phase alternating current supply, comprising in combination electrode drive rolls for engaging and feeding the consumable electrode, a differential gear having two input shafts and an output shaft, the output shaft being connected to rotate the drive rolls, each input shaft being driven by one of two motors, the two motors being arranged for rotation in opposite relative sense, a transformer having a primary winding connected to one phase of the three-phase current supply, having two secondary windings connected one to supply each of the two said motors and a control winding arranged so that a current flowing therein serves to increase the output of one said secondary winding while decreasing the output of the other said secondary winding, said control winding having applied thereto a first voltage of phase corresponding to one phase of the three-phase current supply other than that phase from which the arc current supply circuit is energized and, in series with the said first voltage, a second voltage derived from the arc current supply circuit which varies progressively in magnitude and phase with variation of welding arc length.

References Cited in the file of this patent

UNITED STATES PATENTS 2,487,429     Edwards _____ Nov. 8, 1949